United States Patent
Liang et al.

(10) Patent No.: US 7,446,143 B2
(45) Date of Patent: *Nov. 4, 2008

(54) INTERCALATES, EXFOLIATES AND CONCENTRATES THEREOF FORMED WITH PROTONATED, NON-CARBOXYLIC SWELLING AGENT AND NYLON INTERCALANTS POLYMERIZED IN-SITU VIA RING-OPENING POLYMERIZATION

(75) Inventors: Ying Liang, Zurich, IL (US); Tie Lan, Buffalo Grove, IL (US); Scott Omachinski, Palatine, IL (US)

(73) Assignee: AMCOL International Corp., Arlington Heights, IL (US)

( * ) Notice: Subject to any disclaimer, the term of this patent is extended or adjusted under 35 U.S.C. 154(b) by 604 days.

This patent is subject to a terminal disclaimer.

(21) Appl. No.: 11/152,405

(22) Filed: Jun. 14, 2005

(65) Prior Publication Data
US 2005/0256244 A1 Nov. 17, 2005

Related U.S. Application Data

(63) Continuation-in-part of application No. 10/214,672, filed on Aug. 8, 2002, now Pat. No. 6,906,127.

(51) Int. Cl.
*C08K 3/34* (2006.01)
(52) U.S. Cl. .................. 524/445; 524/186; 524/447
(58) Field of Classification Search ................ 524/447, 524/186, 445; 501/145
See application file for complete search history.

(56) References Cited

U.S. PATENT DOCUMENTS

| | | | |
|---|---|---|---|
| 2,562,796 A * | 7/1951 | Koch ........................... 526/67 |
| 4,739,007 A | 4/1988 | Okada et al. |
| 5,102,948 A | 4/1992 | Deguchi et al. |
| 5,853,886 A | 12/1998 | Pinnavaia et al. |
| 5,877,248 A | 3/1999 | Beall et al. |
| 5,880,197 A | 3/1999 | Beall et al. |
| 5,994,445 A | 11/1999 | Kaschel et al. |
| 6,060,509 A | 5/2000 | Jiang |
| 6,136,908 A * | 10/2000 | Liao et al. ................... 524/445 |
| RE37,385 E | 9/2001 | Okada et al. |
| 6,417,262 B1 * | 7/2002 | Turner et al. ................ 524/445 |
| 6,462,122 B1 | 10/2002 | Qian et al. |
| 6,632,868 B2 | 10/2003 | Qian et al. |
| 6,906,127 B2 * | 6/2005 | Liang et al. ................. 524/445 |

FOREIGN PATENT DOCUMENTS

WO  WO 2006/000550 A1 * 1/2006

OTHER PUBLICATIONS

B. Lepoittevin et. al. "Polymer/layered silicate nanocomposite by combined intercalative polymerization and melt intercalation: a master batch process" Polymer 44, (2003) 2033-2040.*
A. Usuki et. al. "Synthesis of nylon 6-clay hybrid" J. Mater. Res. vol. 8, No. 5, (1993) 1179-1184.*
D. Kubies et. al. "Controlled Ring-Opening Polymerization of Caprolactone in the presence of Layered Silicates and Formulation of Nanocomposite" Macromolecules, 2002, 35, 3318-3320.*

* cited by examiner

*Primary Examiner*—Katarzyna Wyrozebski
(74) *Attorney, Agent, or Firm*—Marshall, Gerstein & Borun LLP

(57) ABSTRACT

A method of manufacturing a nanocomposite composition comprising forming an intercalating composition comprising 1% to about 90% by weight of a purified sodium smectite clay that contains at least 75% $Na^+$ ions based on the total interlayer exchangeable cations, that has been intercalated and thereby swollen sufficiently for polyamide monomer or oligomer intercalation, with a protonated organic, non-carboxylic acid moiety-containing onium ion swelling agent; and about 10% to about 99% of a lactam ring-containing monomer or oligomer, and heating the intercalating composition to a temperature above the melting point of the lactam to open the lactam ring and polymerize the lactam to form the polyamide while in contact with the smectite clay.

25 Claims, No Drawings

INTERCALATES, EXFOLIATES AND CONCENTRATES THEREOF FORMED WITH PROTONATED, NON-CARBOXYLIC SWELLING AGENT AND NYLON INTERCALANTS POLYMERIZED IN-SITU VIA RING-OPENING POLYMERIZATION

CROSS-REFERENCE TO RELATED APPLICATION

This application is a continuation-in-part of application Ser. No. 10/214,672 filed Aug. 8, 2002, now U.S. Pat. No. 6,906,127 B2.

TECHNICAL FIELD

The compositions, methods and articles described herein are intercalates, exfoliates, nanocomposites and nanocomposite concentrates thereof formed with a protonated swelling agent, such as protonated octadecylamine, and nylon intercalants polymerized in-situ via ring-opening polymerization. More particularly, the described herein is the manufacture of nanocomposites formed by intercalating a purified sodium smectite clay with a protonated organic, non-carboxylic swelling agent and a nylon that is formed (polymerized) while in contact with the clay, during melt processing and ring-opening polymerization of the nylon reactants (monomers). The nanocomposites can be in the form of concentrates that can be mixed into any desired matrix polymer to provide optimum dispersion and exfoliation of the nylon-intercalated smectite clay to provide excellent barrier properties (low gas permeability) in a film of the resulting nanocomposite as well as heat stability and dimensional stability.

BACKGROUND AND PRIOR ART

It is well known in the art to manufacture nanocomposites by polymerizing a polyamide monomer while in contact with a layered silicate material, e.g., a sodium smectite clay, that has been treated with a swelling agent, such as an onium ion, to form a nylon polymer-intercalated layered silicate dispersed in additional (non-intercalated) melted polymerized nylon (matrix polymer), e.g., see Toyota U.S. Pat. No. 4,739,007 (RE 37,385). As sown in comparative Example 3 of this Toyota reissue patent, the octadecylamine swelling agent could not provide sufficient clay swelling to produce a nanocomposite sufficient to generate data.

Those skilled in the nanocomposite art have attempted to make a master batch or concentrate that includes a relatively high percentage of nylon-intercalated layered silicate material, e.g., 10% by weight or more layered silicate material, dispersed within a matrix polymer, without success. A primary difficulty in the melt-compounding manufacture of a nylon nanocomposite concentrate is that swelling agent-treated layered silicate materials have excellent compatibility with nylons, leaving little non-intercalated, melted nylon to enable sufficient flow (pumpability) of the composite material out of the compounder. Such concentrates frequently are in a relatively dry chunk or cake form, that adheres to reactor walls and compounder surfaces, having the nylon-intercalated clay unevenly dispersed within the little remaining excess, non-intercalated, nylon matrix polymer. Examples of required low percentages of layered silicate materials used in nylon-intercalated nanocomposite compositions are found in the Toyota U.S. Pat. No. 4,739,007 (RE 37,385) (5%) and Wolf Walsrode U.S. Pat. No. 5,994,445 (2%).

DEEFINITIONS

Whenever used in this specification, the terms set forth shall have the following meanings:

"Sodium Smectite Clay" shall means a smectite clay that has been purified by ion-exchange, for example, as described in this assignee's U.S. Pat. No. 6,050,509, hereby incorporated by reference, to contain at least 70% interlayer exchangeable sodium ions in relation to all interlayer exchangeable cations.

"Platelets" shall mean individual layers of the smectite clay intercalated as described herein.

"Intercalate" or "Intercalated" shall mean a Smectite Clay that includes a polyamide polymer, polymerized in-situ, disposed between adjacent platelets of the Layered Silicate Material to increase the interlayer spacing between the adjacent platelets to at least about 10 Å, preferably to at least about 20 Å.

"Intercalation" shall mean a process for forming an Intercalate.

"Intercalant Monomer" or "Intercalant" or "Polyamide Monomer" shall mean a monomeric organic compound that is capable of reacting and/or polymerizing to form a polyamide polymer that is mixed with the Sodium Smectite Clay at a temperature sufficient for polymerization (melt compounded), so that a portion thereof is sorbed between Platelets of the Smectite Clay, polymerized to a polyamide and complexed with the platelet surfaces to form a polyamide Intercalate, and a portion of the Intercalant Monomer polymerizes to a polyamide outside of the platelet interlayer spaces to form part of a matrix polymer of a nanocomposite.

"Intercalating Carrier" shall mean a carrier comprising water with or without an organic solvent used together with an Intercalant Monomer to form an Intercalating Composition capable of achieving Intercalation of the Smectite Clay.

"Intercalating Composition" shall mean a composition comprising one or more Intercalant Monomers, an Intercalating Carrier for the Intercalant Monomer, and a Smectite Clay.

"Exfoliate" or "Exfoliated" shall mean individual platelets of an Intercalated Smectite Clay so that adjacent platelets of the Intercalated Sodium Smectite Clay can be dispersed individually throughout a carrier material, such as water, a polymer, an alcohol or glycol, or any other organic solvent, together with tactoids of 2-20 non-exfoliated platelets.

"Exfoliation" shall mean a process for forming an Exfoliate from an Intercalate.

"Nanocomposite" shall mean a thermoplastic or thermosetting polymer or polyamide in which the Intercalate and/or Exfoliate is dispersed.

SUMMARY OF THE COMPOSITION, METHODS, AND ARTICLES

In brief, master batches or concentrate compositions containing about 6% to about 40%, preferably about 8% to about 30% by weight nanomer are prepared by mixing a sodium smectite clay, ion-exchanged on its platelet surfaces with a protonated organic, non-carboxylic acid moiety-containing onium ion-swelling agent, with one or more monomers capable of polymerizing during the process to form a polyamide or nylon, preferably a lactam, such as those disclosed in U.S. Pat. No. 4,739,007, hereby incorporated by reference, particularly ε-caprolactam or caprolactam. The polyamide monomer(s) are polymerized, in situ, while mixed with the sodium smectite clay to form a nylon-intercalated sodium smectite clay (nylon-intercalate). Master batch or concentrate compositions can be prepared containing 6% to about 80% by weight, preferably about 8% to about 50% by weight, nanomer, in a nylon matrix polymer, that can be diluted with additional matrix polymer that is the same as, or different from the nylon that has been polymerized and intercalated into the sodium smectite clay during the melt compounding process.

Accordingly, in accordance with one aspect of the compositions, methods, and articles described herein, flowable melt master batches or concentrate compositions can be prepared that include at least 3% by weight, preferably at least 8% by weight, of a protonated non-carboxylic acid moiety-containing intercalated smectite clay and an in-situ polymerized polyamide.

Another aspect of the compositions, methods, and articles described herein is to provide a nanocomposite concentrate composition, containing 6% to about 80% by weight Nanomer, that can be diluted with any matrix polymer, preferably a polyamide matrix polymer, without significant shearing, so that the resulting nanocomposite has significantly less polymer degradation.

The above and other aspects and advantages of the compositions, methods, and articles described herein will become more apparent from the following detailed description.

DETAILED DESCRIPTION OF THE PREFERRED EMOBODIMENT

The intercalate concentrate compositions described herein preferably are dispersed uniformly into a matrix polymer, e.g., a polyamide, to form a polymer/clay intercalate-containing nanocomposite and/or a polymer/exfoliate-containing nanocomposite by direct compounding of the polyamide monomer and subjecting the monomer to polymerization conditions to polymerize the polyamide monomer while mixed with the sodium smectite clay to form the concentrate nanocomposite compositions. The concentrates can later be mixed with additional matrix polymer, preferably without subsequent polymer-degrading shear. The intercalate concentrate can be directly compounded with additional pristine matrix polymer, preferably the same polyamide that results from polymerization of the polyamide monomer intercalant, in situ, to form a nanocomposite easily, while achieving a nanocomposite material with homogeneously dispersed smectite clay platelets and tactoids.

In accordance with a preferred embodiment, intercalates are prepared by first contacting the layered silicate material with a monomeric, protonated, non-carboxylic acid moiety-containing onium ion spacing/swelling agent compound. To achieve the full advantage, the protonated onium ion should include at least one long chain radical ($C_6+$) that may be aliphatic, straight or branched chain alkyl, or aralkyl. Exemplary of such preferred $C_6+$ onium ion molecules include primary, secondary, or tertiary quaternary ammonium ions, sulfonium ions, phosphonium ions, oxonium ions, or any ion of an element in Groups V or VI of the periodic table of elements, that have been protonated with excess acid to assure complete protonation of the Group V or VI atom.

In accordance with an important feature of the preferred embodiment, best results are achieved by mixing the sodium smectite clay with the protonated, non-carboxylic acid moiety-containing onium ions, e.g., $C_6+$ onium ion spacing swelling agent, in a concentration of at least about 2% by weight, preferably at least about 5% by weight onium ion compound, more preferably at least about 10% by weight onium ion compound, and most preferably about 20% to about 50% by weight, based on the weight of onium ion compound and carrier (e.g., water, with or without an organic solvent for the onium ion compound) to achieve better sorption of the onium ion spacing agent compound between the platelets of the sodium smectite clay.

The co-intercalation of the protonated, non-carboxylic acid moiety-containing onium ion spacing/swelling agent and the polyamide monomer intercalant that is polymerized during the in-situ polymerization process form a concentrate intercalate or a concentrate exfoliate, in accordance with one embodiment of the compositions, methods, and articles disclosed herein. Polymerization of the polyamide monomer is accomplished, preferably, by starting with a lactam monomer, such as caprolactam, and opening the lactam ring structure to begin polymerization. Ring opening can be accomplished with or without a ring-opening catalyst, such as caproic acid. The intercalate or exfoliate concentrate that can be added to a matrix oligomer or polymer, particularly by direct compounding (mixing the intercalate concentrate and/or exfoliate concentrate directly into a matrix polymer melt, preferably a polyamide matrix polymer melt that is the same as the intercalated monomer that is polymerized in-situ) of the intercalate and/or exfoliate concentrate composition with a matrix oligomer or matrix polymer that is in the same class of polymers, e.g., preferably nylon 6, nylon 11, nylon 12, or MXD6 nylon. In addition, the intercalate concentrate and/or exfoliate concentrates can be processed to form alloys or blends with other polymer(s) with or without a compatiblizer. Other polyamide-compatible matrix polymers include polyesters, polycarbonates, and their derivatives. Additional polymers, such as polyolefins, e.g., polyethylene and/or polypropylene, can be made polyamide-compatible by adding a compatibilizing agent, such as a maleic anhydride-modified polyolefin as disclosed in this assignee's U.S. Pat. Nos. 6,462, 122 and 6,632,868. The intercalate and/or exfoliate concentrate, added to the matrix polymer, improves a number of properties of the matrix polymer, including tensile properties, dimensional stability, ductility, gas-impermeability, and the like.

When the intercalate and/or exfoliate concentrate compositions described herein are mixed with a melt of a matrix polymer after shearing, (preferably the same matrix polymer as the intercalant polymer that results from polymerizing the intercalant polyamide monomer in-situ), the sodium smectite clay is unexpectedly easily dispersed throughout the matrix polymers, without degradation by shearing of the added matrix polymer.

The sodium smectite clay is intercalated, preferably by first contacting the sodium smectite clay with a protonated, non-carboxylic acid moiety-containing onium ion spacing/swelling agent and simultaneously or thereafter adding the melted polyamide monomer or oligomer intercalant(s) to the onium ion-intercalated sodium smectite clay, such as by direct compounding of the sodium smectite clay and the melted polyamide monomer(s) or oligomer(s) intercalant in an extruder, to intercalate the onium ion and melted polyolefin monomer(s) or oligomer(s) between adjacent layered silicate platelets and optionally separate (exfoliate) the layered silicate material into individual platelets.

Addition of the intercalate and/or exfoliate concentrate composition to a polymer melt enhances one or more properties, such as strength, temperature resistance, dimensional stability, ductility, and/or gas impermeability of the polymer; or mixing the intercalate with a carrier or solvent material maintains and/or increases viscosity and thixotropy of the carrier material. The intercalate is easily, homogeneously and uniformly dispersed throughout a matrix oligomer or matrix polymer and provides new and unexpected strength and/or gas impermeability properties to matrix polymers by virtue of the unexpectedly homogeneous dispersability of the intercalate and/or exfoliate polyamide concentrate composition throughout a matrix oligomer or polymer, particularly a polyamide matrix oligomer or polymer.

In a preferred embodiment, the interlaminar spacing between adjacent platelets of a layered silicate material, e.g., a phyllosilicate, is expanded for easier co-intercalation by a first treatment of intercalation and ion-exchange of the protonated, non-carboxylic onium ions between the purified sodium smectite clay platelets, prior to or simultaneously with intercalation of the polyamide monomer(s) or oligomer(s). It should be understood that the polyamide monomer or oligomer intercalant(s) can be intercalated between and complexed to the internal platelet faces by other well known mechanisms, such as the dipole/dipole (direct intercalation of the polyamide monomer or oligomer) method disclosed in this Assignee's U.S. Pat. Nos. 5,880,197 and 5,877,248, hereby incorporated by reference; and by the acidification technique by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, both patents hereby incorporated by reference.

The optional, but preferred onium ion spacing agent cations intercalated via ion-exchange into the interlayer spaces between adjacent layered silicate material platelets are primary, secondary, tertiary or quaternary onium ions having the following preferred structure:

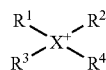

wherein X=N, P, S, or O; and wherein $R^1$, $R^2$, $R^3$ and $R^4$ are H or organic moieties, such as linear or branched alkyl, aryl or aralkyl moieties having 6 to about 24 carbon atoms.

The protonated $C_6+$ onium ions are preferably quaternary ammonium ions having Formula 1, as follows:

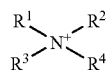

Formula 1 wherein $R^1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R^2$, $R^3$ and $R^4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1-10 moles of ethoxylation or 1-10 moles of propoxylation. Preferred protonated onium ions include protonated octadecylamine, protonated hexyl amine; protonated octyl amine; protonated tallow amine; protonated tallow diamine; protonated tallow triamine; protonated tallow tetraamine; protonated hydrogenated tallow amine; protonated hydrogenated tallow diamine; protonated hydrogenated tallow triamine; protonated hydrogenated tallow tetraamine; protonated octadecyl amine; and mixtures thereof.

Additional useful, multi-protonated spacing/coupling agents include for example, tetra-, tri-, and di-onium species such as tetra-ammonium, tri-ammonium, and di-ammonium (primary, secondary, tertiary and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

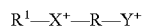

where $X^+$ and $Y^+$, same or different, are ammonium, sulfonium, phosphonium, or oxonium radicals such as

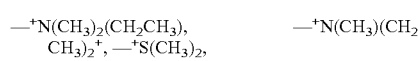

and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and/or $O^+$ cations and $R^1$ can be hydrogen, or an alkyl radical of 1 to 22 carbon atoms, linear or branched, preferably having 6 to 24 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane, but not carboxyl. Examples of $R^1$ include non existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful non-carboxyl R groups are alkylenes, such as methylene, ethylene, octylene, nonylene, tert-butylene, neopentylene, isopropylene, sec-butylene, dodecylene and the like; alkenylenes such as 1 propenylene, 1-butenylene, 1 pentenylene, 1 hexenylene, 1 heptenylene, 1 octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p methylphenylamino nonadecylene and the like; diarylaminoalkylenes, such as diphenylamino pentadecylene, p-nitrophenyl p' methylphenylamino octadecylene and the like; alkylarylaminoalkylenes, such as 2 phenyl-4 methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclooctylene, cycloheptylene and the like; alkoxyalkylenes such as methoxymethylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10 phenyldecylene and the like; alkylarylenes such as 3 decylphenylene, 4-octylphenylene, 4 nonylphenylene and the like; and polypropylene glycol and polyethylene glycol substituents such as ethylene, propylene, butylene, phenylene, benzylene, tolylene, p styrylene, p phenylmethylene, octylene, dodecylene, octadecylene, methoxyethylene, and the like. Such tetra, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

Suitable multi-charged spacing/swelling agent compounds are multi-onium ion compounds that include at least two primary, secondary, tertiary or quaternary ammonium, phosphonium, sulfonium, and/or oxonium ions having Formula 2, as follows:

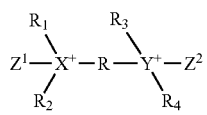

Formula 2 where $X^+$ and $Y^+$, same or different, are ammonium, sulfonium, phosphonium, or oxonium radicals, and wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R^4$ are non-carboxyl moieties, same or different, selected from the group consisting of hydrogen, alkyl, aralkyl, benzyl, substituted benzyl, e.g., straight or branched chain alkyl substituted and halogen substituted; ethoxylated or propoxylated alkyl; ethoxylated or propoxylated benzyl, e.g., 1-10 moles of ethoxylation or 1-10 moles of propoxylation. $Z^1$ and $Z^2$, same or different; may be non existent, or may be any of the moieties described for $R_1$, $R_2$, $R_3$ or $R_4$. Also, one or both of $Z^1$ and $Z^2$ may include one or more positively charged atoms or protonated onium ion molecules.

The purified sodium smectite clay can be formed by ion-exchange, as described in this assignees U.S. Pat. No. 6,050,509. Smectite clays are naturally occurring minerals. Most of the smectite clays have alkaline and/or alkaline earth atoms as exchanged cations. Smectite clays with alkaline, particularly Na, as exchanged ions have much greater use due to their hydration power. Conversion of regular smectite clays from their natural states to Na form was commonly achieved through soda ash ($Na_2CO_3$) treatment while the clay was in a slurry or semi-solid state. In such a process, excess soda ash is used and a reaction by-product $CaCO_3$ and excess $Na_2CO_3$ will stay in the finished products. The presence of $CaCO_3$ and excess $Na_2CO_3$ is very harmful for clay modification, particularly with protonated organic species, due to the disruption of the designated pH value for organic molecule protonation. In addition, residual $CaCO_3$ and $Na_2CO_3$ can also harm the subsequent monomer polymerization since in-situ polymerization is controlled by an acid or base catalyst system. $CaCO_3$ and $Na_2CO_3$ will create negative impact in plastics for the future use.

The assignee invented an ion exchange process to convert smectite clays from Ca form to Na form (U.S. Pat. No. 6,050,509). In this process, dispersed clay in an aqueous slurry passes a series of ion exchange columns packed with a $Na^+$-containing resin. $Ca^{++}$ on the clay surface will be exchanged with the Na on the resin surface. $Ca^{++}$ will be adsorbed on the resin surface and removed. The product will be only a Na form of the smectite clay. In practice, this exchange process is kinetically controlled and the exchange efficiency is determined by the slurry concentration and slurry flow rate through the ion exchange column.

The amount of onium ion spacing agent intercalated into the sodium smectite clay, in order that the intercalated layered material platelet surfaces sufficiently complex or bond via ion-exchange to the protonated onium ion spacing swelling agent molecules such that the sodium smectite clay may be sufficiently spaced for easy intercalation of a polyamide monomer or oligomer may vary substantially between about 2%, preferably at least about 10%, and up to about 80%, based on the dry weight of the sodium smectite clay. In the preferred embodiments, amounts of onium ion employed, with respect to the dry weight of sodium smectite clay being intercalated, will preferably range from about 8 grams of onium ion spacing agent compound: 100 grams of sodium smectite clay (dry basis), preferably at least about 10 grams of onium ion spacing agent compound: 100 grams of sodium smectite clay to about 80-90 grams onium ions spacing agent compound: 100 grams of sodium smectite clay. More preferred amounts are from about 20 grams of onium ion spacing agent compound: 100 grams of sodium smectite clay to about 60 grams of onium ion spacing agent compound: 100 grams of sodium smectite clay (dry basis).

The polyamide monomer or oligomer intercalant may be introduced into (sorbed within) the interlayer spaces of the sodium smectite clay in a number of ways. In one method of intercalating the preferred polyamide monomer intercalant between adjacent platelets of the sodium smectite clay, the sodium smectite clay is slurried in water, e.g., at 0.1 to 10% by weight sodium smectite clay and 90-99.9% by weight water, and an onium ion compound is dissolved in the water in which the sodium smectite clay is slurried. The protonated organic species can be dissolved into water as a salt or dissolved in water with assistance of acids. If necessary, the onium ion compound can be dissolved first in an organic solvent, e.g., propanol. The layered material then is separated from the slurry water and dried prior to mixing with the polyamide monomer intercalant (or co-intercalants) for intercalation of the polyamide monomer to form the nanocomposite material, preferably in a concentrated form in a polyamide matrix oligomer or matrix polymer.

In a preferred method of intercalating the polyamide monomer, the protonated organic, non-carboxylic acid moiety-containing onium ion-treated layered silicate material is intimately mixed with one or more polyamide monomers at or about its melt temperature, e.g., by extrusion or pug milling, to form an intercalating composition comprising the protonated onium ion-intercalated layered material and one or more intercalant polyamide monomers. In a preferred method of intercalating the polyamide monomer intercalant, a protonated onium ion-exchanged sodium smectite clay is intimately mixed with a melt of the polyamide monomer(s), e.g., by extrusion or pug milling, to form an intercalating composition comprising a protonated onium ion-intercalated sodium smectite clay and a melt of the polyamide monomer to form an intercalated concentrate composition for later dilution by the addition of matrix oligomers or matrix polymers to form the nanocomposite.

It is preferred to use the onium ion salt of the protonated organic intercalant, such as an acetate or methyl sulfate. If the salts are not available, the preferred molar ratio of acid to onium ion intercalant is 1:1. The molar ratio of the protonated onium ion intercalant to $Na^+$ on the clay platelet surface should be at least 50% molar ratio, preferably at least 60%, more preferably at least 70%.

In accordance with a preferred embodiment of the intercalates, exfoliates, nanocomposite and nanocomposite concentrate compositions described herein, the onium ion-intercalated (ion-exchanged) layered silicate material can be intercalated with one or more polyamide monomers or oligomers by direct melt mixing in a mixing device, such as a mixing vessel or tank, and then the polyamide monomer or oligomer is polymerized, in-situ, to form the nanocomposite. The matrix polymer is added to the concentrate of polyamide monomer-intercalated sodium smectite clay after polymerization of the polyamide monomers, preferably without extrusion of the added matrix polymer, after extruding the sodium smectite clay with a melt of the polyamide monomer(s) to form the nanocomposite concentrate in an extruder.

The polyamide monomer intercalants are introduced in the form of a solid or liquid composition (neat or aqueous) having an intercalant monomer concentration of at least about 2%, preferably at least about 5% by weight intercalant monomer, more preferably at least about 50% to about 100% by weight intercalant monomer in the intercalating composition, based on the dry weight of the protonated organic, non-carboxylic acid moiety-containing onium ion-intercalated smectite clay, for intercalant monomer sorption and subsequent in-situ polymerization. The intercalant monomer can be added as a solid with the addition to the layered material/intercalant monomer blend of about 20% by weight water, preferably at least about 50% water to about 200% water or more, based on the dry weight of layered material. Preferably about 30% to about 50% water, more preferably about 30% to about 40% water, based on the dry weight of the layered material, is included in the intercalating composition during the mixing process so that less water is sorbed by the intercalate, thereby necessitating less drying energy after intercalation. The polyamide monomer intercalants may be introduced into the spaces between every layer, nearly every layer, or at least a predominance (more than 50%) of the layers of the layered material such that the subsequently exfoliated platelet particles are preferably, predominantly less than about 5 layers in thickness; more preferably; predominantly about 1 or 2 layers in thickness; and most preferably, predominantly single platelets.

The polyamide intercalant monomer has an affinity for the phyllosilicate so that it is sorbed between, and is maintained associated with the surfaces of the silicate platelets, in the interlayer spaces, and after exfoliation.

Sorption of the intercalant (polyamide) monomer should be sufficient to achieve expansion of adjacent platelets of the layered material (when measured dry) to an interlayer spacing of at least about 5 Å, preferably to a spacing of at least about 16 Å, more preferably a spacing of at least about 20 Å, and most preferably a spacing of about 20-30 Å.

As used herein the "interlayer spacing" refers to the distance between the internal faces of the adjacent silicate platelet layers as they are assembled in the layered material before any delamination (exfoliation) takes place. The interlayer spacing is measured when the protonated organic, non-carboxylic acid moiety-containing onium ion-intercalated smectite clay is dispersed in the monomer, with or without water.

The amount of polyamide intercalant monomer intercalated into the swellable sodium smectite clay such that the layered material may be easily exfoliated or delaminated into individual platelets, may vary substantially between about 10% and about 90%, based on the dry weight of the sodium smectite clay, with the remainder of the polyamide monomer polymerizing free from the sodium smectite clay for use as a portion of the matrix polymer. In manufacturing the nanocomposite concentrate compositions, amounts of polyamide monomer mixed with the sodium smectite clay, based on the dry weight of the sodium smectite clay polyamide, in the intercalating composition, will preferably range from about 100 grams of polyamide monomer: 100 grams of sodium smectite clay (dry basis), to about 900 grams of polyamide monomer: 100 grams of sodium smectite clay. More preferred amounts are from about 235 grams of polyamide monomer: 100 grams of sodium smectite clay to about 565 grams of polyamide monomer: 100 grams of sodium smectite clay (dry basis).

EXAMPLES

Example 1

Example 1 demonstrates the ion exchange process of smectite clay from a Ca form or Na/Ca mixed forms to Na-rich smectite clay.

Raw smectite clay was dispersed into water to make a 3 wt % clay slurry. This clay has a Na content of 0.20 wt % and Ca content of 2.10 wt %. The elemental analysis was measured by an X-ray fluorescence method. The mixture was mixed thoroughly with a mechanical mixer. The pH value of the starting clay slurry is 7-8. An ion exchange resin, such as Amberlite 200C Na, is available from Rohm & Hass packed in a glass column with a 2-in diameter and a 20-in length. A liquid pump was used to pump the clay slurry through the column at 20 ml/min. Elemental analysis of the finished clay, dried from the slurry, indicated that the Na content is 3.45 wt % and Ca content is 0.17 wt %. The ion exchanged clay is called E1-Na-Clay. This clay had a basal spacing of 13 Å.

Comparative Example 1

Comparative Example 1 demonstrates the traditional method to convert Ca, or Ca/Na smectite clays by a soda ash treatment.

Raw smectite clay was dispersed into water to make a 3 wt % solid slurry. This clay has a Na content of 0.20 wt % and Ca content of 2.10 wt %. The mixture was mixed thoroughly with a mechanical mixer. The pH value of the starting clay slurry is 7-8. 5.0 wt % Soda ash, $Na_2CO_3$, based on the dry weight of the clay, was added into the slurry. After all of the soda ash was dissolved, the pH value was measured, and the result was 9-10. The elemental analysis of the dried soda ash slurry-treated clay had a Na content of 3.40 wt % and a Ca content of 2.09 wt %. This clay was designated as EC-Na-clay. This clay had a basal spacing of 13 Å.

Example 2

Example 2 demonstrates the formation of protonated Octadecyl ammonium-treated smectite clay with Octadecyl ammonium acetate from the ion exchanged Na-smectite clay (E1-Na-clay) of Example 1.

100-g of sodium smectite clay E1-Na-clay was dispersed into 3000 ml water through a mechanical mixer. This clay slurry was heated to 80° C. 41.5 g of Octadecyl ammonium acetate from KAO Chemicals was added into the clay slurry. The clay showed excellent flocculation after the addition of the Octadecyl ammonium acetate. The pH of the clay reaction slurry was about 4. The clay was filtered with regular quantitative filter paper with the assistance of a mechanical vacuum pump. Then, the clay was dried in an oven over night at 80° C. and ground to pass through a 300-mesh screen as a fine powder. This modified clay was called E2-ODA-Clay.

Example 3

Example 3 demonstrates the formation of protonated Octadecyl ammonium-treated smectite clay with a solution of Octadecyl ammonium ions in dilute HCl. (E3-ODA-Clay). This sample was measured by powder X-ray diffraction to determine the clay basal spacing after ion exchange. The result is listed in Table-1.

100-g of sodium smectite E1-Na-clay was dispersed into 3000 ml water through a mechanical mixer. This clay slurry was heated to 80° C. 33.8 g of Octadecyl amine was added into 1000 ml of 70° C. water and then mixed with 17.1 g of 10.5 N HCl. The Octadecyl amine-HCl solution was added into the clay slurry followed by mixing. The reaction slurry had a pH of 4. The clay showed excellent flocculation after the addition of the Octadecyl amine-HCl solution. The clay was filtered with regular quantitative filter paper with the assistance of a mechanical vacuum pump. Then, the clay was dried in an oven over night at 80° C. and ground to pass through a 300-mesh screen as a fine powder. This modified clay was called E3-ODA-Clay. This sample was measured by powder X-ray diffraction to determine the clay basal spacing after ion exchange. The result is listed in Table-1.

Comparative Example 2

Comparative Example 2 illustrates the surface modification reaction with soda ash-treated Na-clay with Octadecyl ammonium acetate (CE2-ODA-clay)

100-g of the sodium smectite clay prepared via soda ash treatment (CE-Na-clay) was dispersed into 3000 ml water through a mechanical mixer. This clay slurry was heated to 80° C. 41.5 g of Octadecyl ammonium acetate from KAO Chemicals was added into the clay mixture. The clay showed slight flocculation after the addition of Octadecyl ammonium acetate. The pH of the clay reaction slurry was about 8. The clay was very difficult to filter with the method described in Example 2. No product was collected due to poor filtration.

Comparative Example 3

Comparative Example 3 illustrates the surface modification reaction with soda ash treated clay with Octadecyl amine solution in dilute acid (CE3-ODA-clay)

100-g of sodium smectite clay prepared via soda ash treatment (CE-Na-clay was dispersed into 3000 ml water through a mechanical mixer. This clay slurry was heated to 80° C. 33.8 g of Octadecyl amine was added into 1000 ml of 70° C. water and then mixed with 17.1 g of 10.5 N HCl. The Octadecyl amine-HCl solution was added into the clay slurry followed by mixing. The reaction slurry had a pH of 6. The clay showed some flocculation after the addition of Octadecyl amine-HCl solution. The clay was filtered with regular quantitative filter paper with assistance of a mechanical vacuum pump. The filtration time was nearly 4 times long as the time described in Example 2. Then, the clay was dried in an oven over night at 80° C. and ground to pass through a 300-mesh screen as a fine powder. This modified clay was called CE3-ODA-Clay. This sample was measured by powder X-ray diffraction to determine the clay basal spacing after ion exchange. The result is listed in Table-1.

TABLE 1

Summary of the ODA treated clay prepared under different methods

| Example | Slurry pH | Slurry Filtration | Basal Spacing (Å) | Basal Spacing after Mixing into Caprolactam (Å) |
|---|---|---|---|---|
| E2-ODA-Clay | 4 | easy | 20 | 34 (15%), 34 (3%) |
| E3-ODA-Clay | 4 | easy | 20 | 34 (15%), 34 (3%) |
| CE2-ODA-Clay | 10 | Impossible | n/a | n/a |
| CE3-ODA-Clay | 6 | Marginal | 13 (main), 20 (weak) | 12 (main), 34 (weak) |

Analysis results indicate that E2-ODA-Clay and E3-ODA-Clay are equivalent. They also performed equally in the nanocomposite and concentrate formation process.

Example 4

Example 4 demonstrates the formation of a nylon 6 monomer caprolactam intercalate concentrate with E2-ODA-Clay.

15 wt % of E2-ODA-Clay was added into molten caprolactam under mechanical mixing. The clay dispersed well in the caprolactam. A small sample of the dispersion was taken out and allowed to cool to room temperature and then ground to a 300-mesh powder for X-ray analysis. The clay basal spacing was 34 Å, as listed in Table-1 (15%). The increased basal spacing indicates the intercalation of monomer caprolactam into the clay interlayer galleries. The mixture was melted at 80-90° C. in an oven and, thereafter, was charged into a reactor having an agitator. The temperature of the reactor was increased to 265° C. The reactor agitator operated at 60 rotations per minute (rpm). The reaction time was 2 hours, and the reactor was purged with argon during the reaction time. The finished mixture was washed with hot water a few times to remove monomer, dimmer and trimer.

The finished product was measured by XRD to study the layered silicate dispersion; GPC to study the degree of polymerization; and DSC to investigate the polymer crystallinity. The product was called Conc-E2-ODA-Clay.

Example 5

Example 5 demonstrates the formation of a nylon 6 nanocomposite with monomer caprolactam intercalate with E2-ODA-Clay. The product is called Nano-E2-ODA-Clay.

3 wt % of E2-ODA-Clay was added into molten caprolactam under mechanical mixing. The clay dispersed well in the caprolactam. A small sample of the dispersion was taken out and allowed to cool to room temperature and then ground to a 300-mesh powder for X-ray analysis. The clay basal spacing was 34 Å, as listed in Table-1 (3%). The increased basal spacing indicates the intercalation of monomer caprolactam into the clay interlayer galleries. The mixture was melted at 80-90° C. in an oven and, thereafter, was charged into a reactor having an agitator. The temperature of the reactor was increased to 265° C. The reactor agitator operated at 60 rotations per minute (rpm). The reaction time was 10 hours, and the reactor was purged with argon during the reaction time. The finished mixture was washed with hot water a few times to remove monomer, dimmer and trimer. The finished product was measured by XRD to study the layered silicate dispersion; GPC to study the degree of polymerization; and DSC to investigate the polymer crystallinity. The product was called Nano-E3-ODA-Clay.

Comparative Example 4

Comparative Example 4 demonstrates the use of CE3-ODA-Clay in the formation of a nanocomposite in caprolactam.

3 wt % of CE3-ODA-clay was added into molten caprolactam under mechanical mixing. The clay dispersed well in the caprolactam. A small sample of the dispersion was taken out and allowed to cool to room temperature and then ground to a 300-mesh powder for X-ray analysis. The clay basal spacing was 34 Å as listed in Table-1. Two basal spacing peaks were observed. The 34Å peak corresponded to the intercalated, treated clay peak, whereas the 12 Å was the original clay peak. Unfortunately, the 12 Å peak is the dominant peak. The mixture was melted at 80-90° C. in an oven and, thereafter, was charged into a reactor having an agitator. The temperature of the reactor was increased to 265° C. The reactor agitator operated at 60 rotations per minute (rpm). The reaction time was 10 hours, and the reactor was purged with argon during the reaction time. The finished mixture was washed with hot water a few times to remove monomer, dimmer and trimer. The finished product was measured by XRD to study the layered silicate dispersion; GPC to study the degree of polymerization; and DSC to investigate the polymer crystallinity. The product is called Nano-CE3-ODA-Clay. The polymerization yield is quite lower than the polymer in Example-6. The clay dispersion is very poor. Clay particles are visible in pressed films.

Example 6

Example 6 demonstrates the formation of a nylon 6 nanocomposite by dilution of the nylon nanoclay concentrate (Conc-E2-ODA-clay) in nylon 6 resin.

20 wt % of the oligomer concentrate of Examples 3 (Conc-E2-ODA-Clay) was mixed with 80 wt % Nylon 6 (Bayer AG's DURETHAN B29). The mixture was extruded in a Leistritz 27 mm twin screw extruder at a processing temperature of 250° C. and screw speed of 300 rpt. The finished compounds were injection molded into testing bars and cast into monolayer films. This sample was named Nano-Conc-E2-ODA-Clay. Mechanical and barrier properties were tested with results shown in the following table. The properties of un-filled B29 were listed as a reference.

Formation of PA6 nanocomposites through melt compounding of modified clay in DURETHAN B29:

| Sample/Properties | Clay Dispersion | Flex Modulus (MPa) | Tensile Modulus (MPa) | HDT (° C.) |
|---|---|---|---|---|
| B29 (Reference) | n/a | 2480 | 3013 | 53 |
| Example 5 Nano-E2-ODA-Clay | excellent | 4042 | 5157 | 95 |
| Example 6 Nano-Conc-E2-ODA-Clay | excellent | 4100 | 5100 | 97 |
| Comparative Example 4 Nano-CE3-ODA-Clay | poor | 3050 | 3290 | 72 |

Example 7

Example 7 demonstrates the formation of nylon 66 nanocomposites by dilution of the concentrate of Example 4 (Conc-E2-ODA-clay) into PA66 resin:

20 wt % of the oligomer concentrate of Example 4 (Conc-E2-ODA-Clay) was mixed with 80 wt % nylon 66 (Du Pont's ZETEL 101). The mixture was extruded in a Leistritz 27 mm twin screw extruder at a processing temperature of 250° C. and screw speed of 300 rpt. The finished compounds were injection molded into testing bars and cast into monolayer films. Mechanical and barrier properties were tested with results shown in the following Table 2.

Comparative Example 5

Formation of Zetyl 101 (nylon 66) nanocomposite through melt compounding of modified clay into Zetyl 101:

TABLE 2

Mechanical Properties of PA66 based nanocomposite

| Sample/Properties | Flex Modulus (MPa) | Tensil Modulus (MPa) | HDT (° C.) |
|---|---|---|---|
| Zytel 101 | 3413 | 3013 | 68 |
| Example 7 | 5100 | 4670 | 92 |
| Comparative Example 5 | 4200 | 4400 | 82 |

Example 8

Formation of nylon 6 nanocomposite with dilution of the concentrate of Example 4 into PA6 for film manufacture.

20 wt % of the oligomer concentrate of Example 4 (Conc-E2-ODA-clay) was mixed with 80 wt % nylon 6 (Honeywell CAPRON B135WP film grade). The mixture was extruded in a Leistritz 27 mm twin screw extruder at a processing temperature of 250° C. and screw speed of 300 rpt. The finished nanocomposites were injection molded into testing bars and cast into monolayer films. Oxygen barrier properties were tested with the results shown in the following Table 3. The properties of un-filled B135WP were listed as a comparative reference.

Example 9

Example 9 demonstrates the Formation of an amorphous nylon nanocomposite by dilution of the concentrate of Example 4 (Conc-E2-ODA-clay) with amorphous nylon.

20 wt % of the oligomer concentrate of Example 4 (Conc-E2-ODA-clay) was mixed with 80 wt % amorphous nylon (Du Pont SELAR 3426). The mixture was extruded in a Leistritz 27 mm twin screw extruder at a processing temperature of 250° C. and screw speed of 300 rpt. The finished compounds were injection molded into testing bars and cast into monolayer films. Oxygen barrier properties were tested with the results shown in the following Table 3. The properties of un-filled Selar 3426 was listed as a comparative reference.

TABLE 3

Clay dispersion and oxygen barrier property of polyamide nanocomposite samples

| Sample/Properties | Dispersion | OTR (cc · mm/m2 · day) |
|---|---|---|
| Zetyl 101 | n/a | 0.80 |
| Example 7 | excellent | 0.46 |
| B135WP (Reference) | n/a | 1.35 |
| Example 8 | excellent | 0.65 |
| Selar 3426 (Reference) | n/a | 0.50 |
| Example 9 | excellent | 0.22 |

Example 10

Example 10 demonstrates the formulation and formation of polyolefin-nylon alloys using the concentrate of Example 4 (Conc-E2-ODA-clay)

6 kg of the concentrate of in Example 4 (Conc.-E2-ODA-clay) was mixed with 24 kg of nylon 6 (Capron 8208), 66 kg of homo-polypropylene, and 4 kg of modified polyolefin, like KRATON, as a compatibilizer. The mixture was compounded in a continuous mixer to make a PP-Nylon alloy. The final nanocomposites exhibited significantly improved mechanical properties compared with the alloy consisting of only of Nylon-8202 as the nylon phase.

HYPOTHETICAL EXAMPLES

Example 11

Example 11 demonstrates the formulation of Polyester-Nylon alloys using the concentrate of Example 4 (Conc-E2-ODA-clay).

The concentrate of Example 4 is blended with PET in a twin screw extruder at a 280° C. processing temperature. The weight ratio of the concentrate: PET is in the range of 1:1 to 1:20. The finished compounds should have excellent clay dispersion and improved polymer properties, including mechanical, fire-resistance and barrier. In addition, the finished nanocomposite should have about the same sample processing ability as the virgin PET, such as injection-molding, stretch-blow molding, film casting, orientated films, multilayer films, laminates, and fiber spinning.

The concentrate of Example 4 is also blended with PBT to form a nanocomposite. The concentrate: PBT weight ratio should be in the range of 1:1 to 1:20. Final composites should exhibit significantly improved mechanical, fire-resistant, and barrier properties.

Example 12

Example 12 demonstrates the formulation and formation of Polycarbonate (PC)-nylon alloys using the concentrate of Example 4 (Conc-E2-ODA-clay)

The concentrate of Example 4 (Conc-E2-ODA-clay) is blended with polycarbonate in a twin screw extruder at a 310° C. processing temperature. The ratio of the concentrate to PC is in the range of 1:1 to 1:20. These finished compounds should have excellent clay dispersion and improved polymer properties, including mechanical, fire-resistance and barrier. In addition, the finished nanocomposites should have the same processing ability as virgin PC resin.

The invention claimed is:

1. A method of manufacturing a nanocomposite composition comprising forming an intercalating composition comprising 1% to about 90% by weight of a purified sodium smectite clay that contains at least 75% Na ions based on the total interlayer exchangeable cations, that has been intercalated and thereby swollen sufficiently for polyamide monomer or oligomer intercalation, with a protonated organic, non-carboxylic acid moiety-containing primary or secondary onium ion swelling agent; and about 10% to about 99% of a lactam ring-containing monomer or oligomer, and heating the intercalating composition to a temperature above the melting point of the lactam to open the lactam ring and polymerize the lactam to form the polyamide while in contact with the smectite clay.

2. The method of claim 1, wherein the nanocomposite composition is a concentrate having about 0.5% to about 80% protonated onium ion-intercalated, purified sodium smectite clay and about 20% to about 99.5% in-situ formed polyamide.

3. The method of claim 2, wherein the nanocomposite composition is a concentrate having about 8% to about 50% onium ion-intercalated purified sodium smectite clay and about 50% to about 92% in-situ formed polyamide.

4. The method of claim 1, wherein the intercalating composition includes about 1% to about 20%, by weight of the lactam ring-containing monomer or oligomer of a lactam ring opening catalyst.

5. The method of claim 4, wherein the lactam ring-opening catalyst comprises amino caproic acid, water, or a combination thereof.

6. The method of claim 1, wherein the polyamide is PA6, PA11, PA12, or a mixture thereof.

7. The method of claim 2, further including the step of melt compounding the nanocomposite concentrate composition with a polyamide matrix polymer to form a melt compounded composition.

8. The method of claim 7, wherein the polyamide matrix polymer is PA6, MXD6, or a mixture thereof.

9. The method of claim 8, wherein the concentrate comprises 10 to 40% of the melt compounded composition and the polyamide matrix polymer comprises 60 to 90% of the melt compounded composition.

10. The method of claim 8, wherein the melt compounded composition is formed into a film.

11. The method of claim 2 comprising about 0.5% to about 30% of the ion-exchanged, onium ion-treated clay and about 70% to about 99.5% in-situ polymerized polyamide.

12. The method of claim 11 comprising about 0.5% to about 20% of the ion-exchanged, onium ion-treated clay and about 80% to about 99.5% in-situ polymerized polyamide.

13. The method of claim 12 comprising about 1% to about 10% of the ion-exchanged, onium ion-treated clay and about 90% to about 99% in-situ polymerized polyamide.

14. A method of forming nanocomposite composition comprising dispersing an intercalate comprising a purified, ion exchange smectite clay having at least 75% Na ions based on the total interlayer exchanageable cations, said clay having 50 to 100 mole percent of its interlayer Na ions exchanged with protonated primary or secondary onium ions that do not contain a carboxylic acid moiety, said onium ion-exchanged clay being intercalated with a lactum ring-containing monomer or oligomer that is polymerized in-situ into a polyamide matrix polymer.

15. The method of claim 14, wherein the nanocomposite composition is a concentrate having about 0.5% to about 80% protonated primary or secondary onium ion-intercalated, purified sodium smectite clay and about 20% to about 99.5% in-situ formed polyamide.

16. The method of claim 15, wherein the nanocomposite composition is a concentrate having about 8% to about 50% onium ion-intercalated, purified sodium smectite clay and about 50% to about 92% in-situ formed polyamide.

17. The method of claim 15, wherein the polyamide is PA6, PA11, PA12, or a mixture thereof.

18. The method of claim 15, wherein the polyamide matrix polymer is an aromatic nylon.

19. The method of claim 18, wherein the aromatic nylon comprises a reaction product of m-xylylenediamine and a dicarboxylic acid.

20. The method of claim 18, wherein the aromatic nylon comprises PAMXD6.

21. A method of making a nanocomposite concentrate composition, comprising forming a concentrate containing about 8% to about 50% by weight of an intercalate comprising a purified, ion exchange smectite clay having at least 75% Na ions based on the total interlayer exchanageable cations, said clay having 50 to 100 mole percent of its interlayer Na ions exchanged with protonated primary or secondary onium ions that do not contain a carboxylic acid moiety, said onium ion-exchanged clay being intercalated with a lactum ring-containing monomer or oligomer that is polymerized in-situ and about 50% to about 92% of a polyamide.

22. A method of forming a nanocomposite composition comprising mixing the nanocomposite concentrate formed by the method of claim 21 into a polyamide matrix polymer.

23. A method of making a nanocomposite composition comprising dispersing about 0.5% to about 30% by weight of an intercalate comprising a purified, ion exchange smectite clay having at least 75% Na ions based on the total interlayer exchangeable cations, said clay having 50 to 100 mole percent of its interlayer Na ions exchanged with protonated primary or secondary onium ions that do not contain a carboxylic acid moiety, said onium ion-exchanged clay being intercalated with a lactum ring-containing monomer or oligomer that is polymerized in- situ and about 70% to about 99.5% by weight of a polyamide matrix polymer.

24. A method of making nanocomposite composition comprising dispersing about 0.5% to about 20% by weight of an intercalate comprising a purified, ion exchange smectite clay having at least 75% Na ions based on the total interlayer exchangeable cations, said clay having 50 to 100 mole percent of its interlayer Na ions exchanged with protonated primary or secondary onium ions that do not contain a carboxylic acid moiety, said onium ion-exchanged clay being intercalated with a lactum ring-containing monomer or oligomer that is polymerized in- situ and about 80% to about 99.5% by weight of a polyamide matrix polymer.

25. A method of making nanocomposite composition comprising dispersing about 1% to about 10% by weight of an intercalate comprising a purified, ion exchange smectite clay having at least 75% Na ions based on the total interlayer exchangeable cations, said clay having 50 to 100 mole percent of its interlayer Na ions exchanged with protonated primary or secondary onium ions that do not contain a carboxylic acid moiety, said onium ion-exchanged clay being intercalated with a lactum ring-containing monomer or oligomer that is polymerized in- situ and about 90% to about 99% by weight of a polyamide matrix polymer.

* * * * *

UNITED STATES PATENT AND TRADEMARK OFFICE
CERTIFICATE OF CORRECTION

| | | |
|---|---|---|
| PATENT NO. | : 7,446,143 B2 | Page 1 of 1 |
| APPLICATION NO. | : 11/152405 | |
| DATED | : November 4, 2008 | |
| INVENTOR(S) | : Ying Liang et al. | |

It is certified that error appears in the above-identified patent and that said Letters Patent is hereby corrected as shown below:

<u>On the Title Page,</u>

Item (75), First named Inventor, "Zurich" should be -- Buffalo Grove --.

<u>In the Claims:</u>

At Column 17, line 3, "ion exchange" should be -- ion-exchanged --.

At Column 17, line 8, "lactum" should be -- lactam --.

At Column 17, line 32, "ion exchange" should be -- ion-exchanged --.

At Column 17, line 37, "lactum" should be -- lactam --.

At Column 18, line 6, "ion exchange" should be -- ion-exchanged --.

At Column 18, line 12, "lactum" should be -- lactam --.

At Column 18, line 17, "ion exchange" should be -- ion-exchanged --.

A Column 18, line 23, "lactum" should be -- lactam --.

At Column 18, line 28, "ion exchange" should be -- ion-exchanged --.

At Column 18, line 34, "lactum" should be -- lactam --.

Signed and Sealed this
Twenty-sixth Day of April, 2011

David J. Kappos
*Director of the United States Patent and Trademark Office*